US007694858B2

(12) United States Patent
Takeda et al.

(10) Patent No.: US 7,694,858 B2
(45) Date of Patent: Apr. 13, 2010

(54) LIQUID FILLING METHOD AND DEVICE

(75) Inventors: Ichiro Takeda, Inuyama (JP); Kenichi Tsukano, Kanazawa (JP); Katsunori Tanikawa, Kanazawa (JP); Masaaki Eda, Kanazawa (JP)

(73) Assignee: Suntory Holdings Limited, Osaka (JP)

( * ) Notice: Subject to any disclaimer, the term of this patent is extended or adjusted under 35 U.S.C. 154(b) by 466 days.

(21) Appl. No.: 10/538,643

(22) PCT Filed: Dec. 11, 2003

(86) PCT No.: PCT/JP03/15866

§ 371 (c)(1),
(2), (4) Date: Dec. 28, 2005

(87) PCT Pub. No.: WO2004/052770

PCT Pub. Date: Jun. 24, 2004

(65) Prior Publication Data

US 2006/0137761 A1 Jun. 29, 2006

(30) Foreign Application Priority Data

Dec. 12, 2002 (JP) ............................ 2002-361443

(51) Int. Cl.
*G01F 11/28* (2006.01)

(52) U.S. Cl. ........................ 222/424; 141/82; 141/285; 222/146.1; 222/318; 366/137; 366/159.1

(58) Field of Classification Search .................. 141/82, 141/285, 302; 222/318, 146.1, 424; 137/563; 366/136, 137, 159.1

See application file for complete search history.

(56) References Cited

U.S. PATENT DOCUMENTS

| | | | | |
|---|---|---|---|---|
| 1,654,379 | A * | 12/1927 | Matzka | 222/130 |
| 4,809,595 | A * | 3/1989 | Catelli | 99/472 |
| 5,502,978 | A * | 4/1996 | Field | 62/157 |
| 5,908,651 | A * | 6/1999 | Gustavsson et al. | 426/399 |
| 5,944,071 | A | 8/1999 | Tietz et al. | |
| 6,120,824 | A * | 9/2000 | Mendez | 426/397 |
| 6,656,423 | B1 * | 12/2003 | Joslyn | 422/1 |

FOREIGN PATENT DOCUMENTS

| | | | |
|---|---|---|---|
| JP | 59-74097 | | 4/1984 |
| JP | 63-67499 | | 5/1988 |
| JP | 2-27236 | | 1/1990 |
| JP | 6-293302 | | 10/1994 |
| JP | 6-293390 | | 10/1994 |
| JP | 6-345191 | | 12/1994 |
| JP | 08-091490 | | 4/1996 |
| JP | 11-249466 | * | 3/2001 |
| JP | 2001-72189 | * | 3/2001 |
| JP | 2002-337988 | | 11/2002 |

* cited by examiner

*Primary Examiner*—Gregory L Huson
*Assistant Examiner*—Jason K Niesz
(74) *Attorney, Agent, or Firm*—Drinker Biddle & Reath LLP

(57) ABSTRACT

A beverage filling method and an apparatus to perform the beverage filling method, wherein a liquid is delivered from a storage tank into a filler tank of a filler, and the liquid is filled into containers by the filler. The method is characterized in that the liquid in the filler tank is returned through return piping attached to the filler tank and refluxed to the storage tank through a reflux path. According to this method, an excess of liquid in the filler can be circulated throughout the entire line.

16 Claims, 5 Drawing Sheets

LIQUID FILLING METHOD AND DEVICE

RELATED APPLICATION DATA

This application is a §371 National Stage Application of PCT International Application No. PCT/JP2003/015866 filed Dec. 11, 2003, the entire contents of which are incorporated herein by reference. This application also claims priority under 35 U.S.C. §119 and/or §365 to Japanese Application No. 2002-361443, filed Dec. 12, 2002, the entire contents of which are incorporated herein by reference.

FIELD OF THE DISCLOSURE

The present disclosure relates to a method of filling a liquid and also relates to an apparatus for use in carrying out the method. More particularly, the present disclosure relates to a liquid filling method and apparatus for uniformly filling a liquid containing a solid component into containers. The present disclosure also pertains to a liquid filling method and apparatus capable of rapidly resuming the operation of a filling line after suspension while preventing deterioration of a filling liquid of high temperature.

STATE OF THE ART

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

In an ordinary beverage production line, the supply of a beverage from a beverage storage tank to a beverage filling machine (hereinafter referred to as simply "filler") is a flow in one direction. If the filler stops operating due to, for example, some problem with a bottle and becomes unable to accept the beverage, a sensor detects this situation and stops delivery of liquid to the filler. When the liquid delivery stops, the beverage in a filler bowl, i.e. a filler tank, cools naturally or is cooled with an aseptic air flow. Therefore, if the production line stops for more than a certain period of time, the liquid temperature becomes lower than the sterilizing temperature of containers, caps, etc. In this case, it is necessary, when resuming the operation of the filling line, to discard the cooled liquid in the filler tank and to blow the heated beverage (i.e. it is necessary to supply the heated beverage to the filler and to discharge it from filling nozzles) in order to raise the temperature of the filler tank and the filling nozzles. Accordingly, there are losses of beverage due to discard and blowing. To reduce these losses of beverage, some methods have been developed; for example, a method wherein when the filling line stops, the beverage in the filler is recovered and returned to the product tank in which the beverage is reheated before being filled [Japanese Patent Unexamined Publication (KOKAI) No. 2001-72189], and a method wherein the beverage in the filler is reheated and circulated [Japanese Patent Unexamined Publication (KOKAI) No. 2002-337988]. However, the former method cannot prevent lowering of the temperature of the filler and needs blowing of the heated beverage in order to heat the filler and the nozzles when resuming the operation. Accordingly, the method suffers a loss of beverage due to the blowing process. The latter method always keeps the beverage in the filler at high temperature and hence allows the operation to be resumed immediately after the problem has been eliminated. On the other hand, because the liquid in the filler is kept at high temperature at all times, the beverage may deteriorate in aroma and taste, depending on the kind of beverage.

There has also been developed a system in which a liquid is constantly circulated through a filling line including a product storage tank, a heat sterilizer, and filling valves [Japanese Patent Unexamined Publication (KOKAI) No. Sho 59-74097]. In this system, the liquid is kept at high temperature while it is refluxed from the filling valves to the product storage tank. Therefore, the aroma and taste of products degrade. In addition, because the liquid of high temperature is refluxed into the product storage tank, the storage tank temperature becomes nonuniform, causing the heat sterilization process to become unstable. Further, a system has been developed in which when the filling operation stops, the heated beverage is allowed to circulate by bypassing through a part of the filling line, excluding the filler (i.e. so-called divert circulation; Japanese Patent Post-Exam Publication No. Hei 2-27236). In this case, the temperature of the beverage in the filler lowers. Therefore, it is necessary to perform blowing to raise the temperature of the filler. Accordingly, there has been a demand for development of a method capable of preventing lowering of the temperature of the beverage in the filler and allowing filling to be started immediately upon resumption of the filling line operation, and also capable of preventing deterioration of aroma and taste of the beverage.

Meanwhile, when filling a beverage containing a solid component, it is difficult to keep the solid component content of the filling liquid constant. Therefore, in one type of filling method, the solid component and the liquid are filled separately from each other. In this case, however, the apparatus becomes large in size and high in cost, and it is difficult to add the apparatus to existing equipment. Accordingly, there has been developed an apparatus in which an additional line is provided to allow the beverage in the filler to circulate through a path in the neighborhood of the filler [Japanese Patent Unexamined Publication (KOKAI) No. Hei 6-293302]. However, even if the solid component content is kept constant by circulating the beverage in the neighborhood of the filler, if the solid component content of the beverage becomes nonuniform at another part of the filling line, it becomes impossible to perform uniform filling. Therefore, there has also been a demand for a method capable of maintaining uniform conditions throughout the production line.

When the filling process is suspended for any reason, the flow of liquid in and out of the filler stops, and the rotating motion of the filler also stops. Consequently, the beverage in the filler stops flowing. If there is no flow of beverage in the filler, the solid component contained in the beverage settles by gravity or surfaces, resulting in separation of the solid component and the liquid. If the filling process is resumed in this state, the solid component content changes as follows. For example, at the beginning of the resumed filling process, the solid component content is high because it has settled. Thereafter, the solid component content becomes extremely low, and as time goes by, it returns to normal and becomes uniform. In this case, the solid component content varies among products undesirably. Accordingly, it has been demanded to develop a method capable of filling with a constant solid component content when the operation of the production line is resumed after suspension.

SUMMARY

The present invention was made in view of the above-described problems with the conventional liquid filling method. An object of the present invention is to provide a liquid filling method and apparatus which is capable of reducing the lead time when the filling operation is resumed, as well as being capable of suppressing the deterioration of aroma and taste of the filling liquid.

Another object of the present invention is to provide a liquid filling method and apparatus capable of keeping the solid component content constant when filling a liquid containing a solid component.

A further object of the present invention is to provide a liquid filling method and apparatus capable of preventing lowering of the temperature of a high-temperature liquid to be filled, thereby reducing the lead time when the filling operation is resumed, and achieving energy saving.

A still further object of the present invention is to provide a liquid filling method and apparatus having a circulation path capable of minimizing the filling liquid loss when filling a liquid of high temperature.

According to the present invention, there is provided a liquid filling method wherein a liquid is delivered from a storage tank into a filler tank of a filler, and the liquid is filled into containers by the filler. The liquid filling method is characterized in that the liquid in said filler tank is returned through a return piping attached to said filler tank and refluxed to said storage tank through a reflux path so that the liquid circulates throughout the entire filling line extending from said storage tank to said filler. According to the present invention, there is provided a liquid filling apparatus that fills a liquid into containers. The apparatus includes a liquid filling line having a storage tank that stores the liquid and a filler that fills said liquid into the containers, wherein the liquid in a filler tank is returned through a return piping attached to the filler tank to the entire liquid filling line so that said liquid constantly circulates throughout said liquid filling line.

According to the present invention, an excess of liquid in the filler tank can be circulated throughout the filling line. Consequently, the liquid can constantly circulate through the line. Therefore, it is possible to suppress lowering of the temperature of the liquid in the filler tank even during suspension of the operation of the line and hence possible to resume production after the suspension of the line operation substantially without lead time. In filling of a liquid containing a solid component, uniform conditions can be maintained throughout the production line. Therefore, it is possible to produce products with no variations in the solid component content, regardless of whether the filling temperature is normal or low.

In addition, according to the present invention there is provided a liquid filling method wherein a liquid delivered from a storage tank is heat-sterilized before being delivered into a filler tank of a filler, and the liquid is filled into containers by the filler. The liquid filling method is characterized in that the liquid in said filler tank is returned through a return piping attached to said filler tank and refluxed to said storage tank through a reflux path so that the liquid circulates throughout the entire filling line extending from said storage tank to said filler, wherein the liquid flowing through said reflux path to said storage tank is cooled. According to the present invention there is provided a liquid filling apparatus that fills a liquid into containers. The liquid filling apparatus includes a liquid filling line having a storage tank that stores the liquid, a heat sterilizer that heat-sterilizes said liquid, and a filler that fills said liquid into the containers, wherein the liquid in a filler tank is returned through return piping attached to said filler tank to the entire liquid filling line so that said liquid circulates throughout said liquid filling line, said apparatus further including a cooling device that cools the liquid flowing through said reflux path.

According to the above-described method and apparatus of the present invention, a part of liquid in the filler tank is constantly refluxed to the storage tank through the reflux path, and the liquid flowing through the reflux path is cooled by a cooling process using a cooling device. By this process, the liquid left unused for filling can be circulated throughout the liquid filling line, regardless of whether filling is being performed or not, and the filler temperature can be always kept at high level. Moreover, the uniformity of the liquid in the line can be guaranteed. Provision of the process for cooling the liquid before it is refluxed to the storage tank prevents quality deterioration of the liquid, which might otherwise occur when the liquid is kept at high temperature for a long period of time. It is also possible to keep the storage tank temperature constant and to stabilize the heat sterilization process.

The above-described liquid filling method may be as follows. The amount of liquid in the filler tank is detected by means of a detecting device, and at least one of the amount of liquid supplied to the filler tank and the amount of liquid returned from the filler tank is controlled according to a detected value from the detecting device. In this case, the liquid quantity may be controlled as follows. During filling by the filler, the amount of liquid supplied to the filler tank may be larger than the amount of liquid returned from the filler tank. During suspension of filling, the amount of liquid supplied to the filler tank may be equal to the amount of liquid returned from the filler tank.

The liquid filling apparatus may have a detecting device that detects the amount of liquid in the filler tank, and a controller that controls at least one of the amount of liquid supplied to the filler tank and the amount of liquid returned from the filler tank according to a detected value from the detecting device. In this case, the liquid quantity may be controlled as follows. During filling by the filler, the amount of liquid supplied to the filler tank may be larger than the amount of liquid returned from the filler tank. During suspension of filling, the amount of liquid supplied to the filler tank may be equal to the amount of liquid returned from the filler tank.

BRIEF DESCRIPTION OF THE DRAWINGS

The following detailed description of preferred embodiments can be read in connection with the accompanying drawings in which like numerals designate like elements and in which.

DETAILED DESCRIPTION OF PREFERRED EMBODIMENTS

Embodiments of the present invention will be described below with reference to the accompanying drawings and with regard to a beverage filling apparatus that fills a beverage as a filling liquid.

Figure 1:
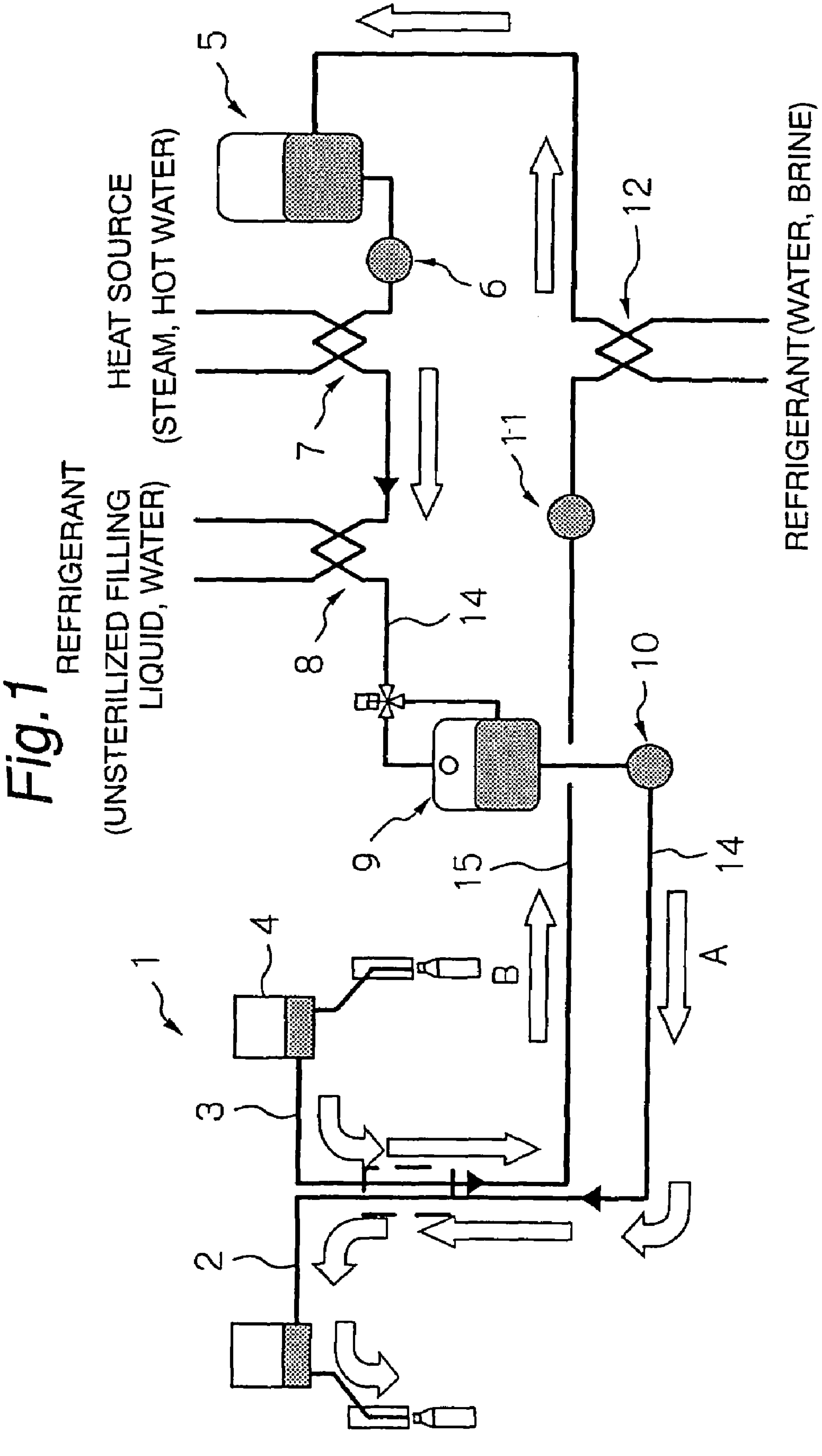
FIG. 1 is a schematic general view of a liquid filling apparatus for carrying out the invention of this application.

FIG. 1 shows an example of the general arrangement of a liquid filling apparatus used to carry out the invention of this application. A beverage stored in a beverage tank 5 is delivered through a liquid delivery pump 6 provided in a supply line 14 to a heat sterilizer 7 in which the beverage is heat-sterilized. The temperature of heat sterilization differs according to the kind of beverage. For example, tea is heat-sterilized at a temperature of about 140° C. A beverage containing fruit flesh is heat-sterilized at a temperature of around 90° C. This process is unnecessary in the case of normal or low-temperature filling. The heat-sterilized beverage is cooled by a cooling device 8 to a temperature suitable for filling, e.g. to a temperature of about 82° C. to 87° C. if containers for filling are PET (polyethylene terephthalate) bottles. This process may be omitted in the case of normal or low-temperature filling. The cooled liquid is deaerated, for example, in a deaeration tank 9. This is done for the purpose of preventing foaming and also preventing quality degradation due to oxidation. The deaeration process may be omitted in the case of normal or low-temperature filling.

Next, the beverage is delivered in the direction of the arrow A through a pump 10 serving as a delivery device and introduced into a filler tank 4 of a filler 1. During a filling operation, the beverage is filled into containers, e.g., PET bottles, by the filler 1 having a publicly known structure. At this time, the liquid level in the filler tank 4 is monitored by means of a level meter. If overflow occurs, the beverage is recovered through return pipes 3 and delivered by a discharge pump 11 provided in a return line 15 in the direction of the arrow B to a cooling device 12 in which the beverage is cooled down to approximately normal temperature. The cooled beverage returns to the beverage tank 5.

By circulating as stated above, the beverage continuously flows through the line and is stirred effectively so that the solid component will not settle or surface. Accordingly, uniform filling can be performed. In addition, the solid component content of the beverage will not vary when the filling process is resumed after suspension of the operation of the line. Further, because lowering of the filler temperature can be prevented, it is possible to rapidly resume the filling process after suspension of the line operation. It is also possible to reduce waste loss due to blowing of beverage (discharge from the filler). Further, because the return liquid is cooled, it is possible to prevent quality degradation that might otherwise occur when the beverage is constantly exposed to high temperature. In addition, it is possible to keep the temperature of the beverage tank 5 substantially constant and hence it is possible to stabilize the subsequent process of heat sterilization. The cooling process may be omitted in the case of normal or low-temperature filling.

Figure 2:
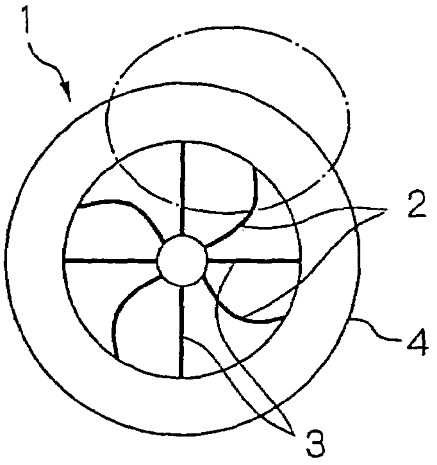
FIG. 2 is a plan view of a filler.
Figure 3:
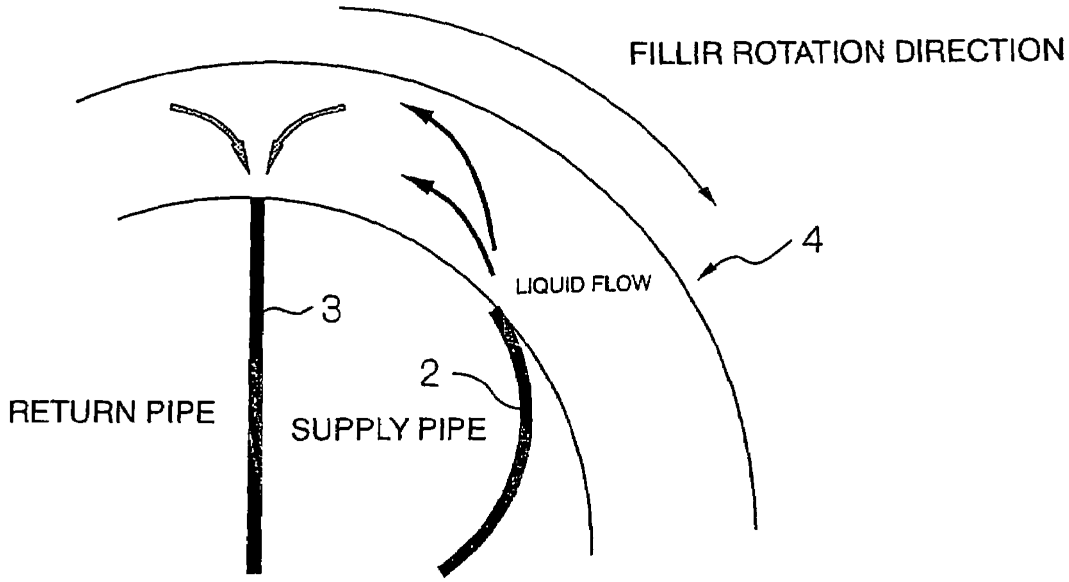
FIG. 3 is an enlarged view of a part of FIG. 2, showing an inlet opening and a return opening in the filler.

In order to reflux the beverage from the filler, the filler tank is provided with return pipes. Each return pipe is connected to the filler tank by welding or by a publicly known method in a leak-free state with a packing or the like interposed therebetween. The number of return pipes is typically about 2 to 4 but may be larger than that. If a double pipe is used for a combination of a supply pipe and a return pipe, piping can be formed from a single system of pipes and thus simplified. In such a case, the feed liquid and the return liquid, which are at high temperature, are adjacent to each other across the pipe wall and hence capable of effectively keeping each other warm. As shown in FIGS. 2 and 3, supply pipes 2 are opened in a direction opposite to the direction of rotation of the filler 1 to cause turbulence in the flow of liquid in the filler 1, thereby enabling the stirring effect to be enhanced. The return pipes 3 may be opened perpendicularly to the circumferential direction as shown in FIGS. 2 and 3. Alternatively, the return pipes 3 may be opened at a certain angle to the circumferential direction to cause turbulence in the flow of beverage. The return pipes 3 may also be opened in the same direction as the beverage flow direction so as not to produce a turbulent flow. It is preferable that the opening of each return pipe 3 be provided at a position where the liquid is uniform in view of the properties of the beverage; for example, in the vicinity of the inlet opening of a supply pipe 2 from which the liquid flows into the filler 1. In a case where stirring members are additionally provided, the opening of each return pipe 3 is preferably provided in the neighborhood of a stirring member.

Figure 4:
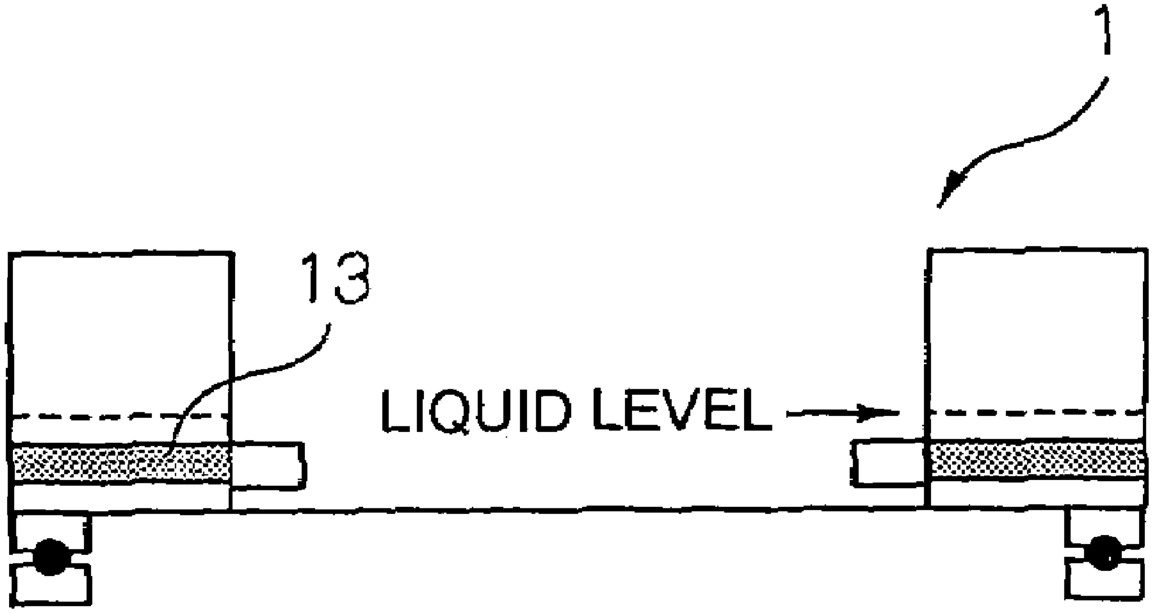
FIG. 4 is a schematic sectional view of a filler tank equipped with stirring members.

In the present invention, the liquid is constantly circulated and thus stirred in the filler tank. If stirring members are used, the liquid can be stirred even more efficiently. Particularly, when the filling operation by the filler stops, although the liquid is continuously circulated, stirring may become insufficient because the turning of the filler and the filling operation are suspended. In such a case, the use of stirring members makes it possible to push down a solid component that is likely to surface and to allow a readily settling component to rise up. Therefore, a liquid containing a solid component can be kept more uniform. In this case, stirring members capable of pushing down or up in the liquid may be used. For example, as shown in FIG. 4, stirring members 13 each have a parallelepiped configuration with a thickness of 2 mm to 5 mm and a width sufficient for the stirring member 13 to cross the inside of the filler tank horizontally so that the stirring member 13 can be secured at one lateral end thereof to the outer surface of the inner periphery of the filler tank and at the other lateral end thereof to the inner surface of the outer periphery of the filler tank. The length of the stirring member 13 is, for example, about 70% of the depth from the liquid surface. The stirring member 13 has an angle of about 20 to 40 degrees with respect to the horizontal plane. The configuration of the stirring members is not necessarily limited to being rectangular parallelepiped. For example, it is also possible to use stirring members having a streamline, elliptic or oval shape, a triangular prism shape, or a quadrangular prism shape with a trapezoid section. It should be noted, however, that the configuration of the stirring members is not necessarily limited to these. It is essential only that the stirring members should be capable of pushing down or up in the liquid. The use of such stirring members allows a liquid containing a solid component to be kept even more uniform when it is circulated throughout the path. Hence, it is possible to rapidly resume the filling operation after suspension of the filler.

Figure 5:
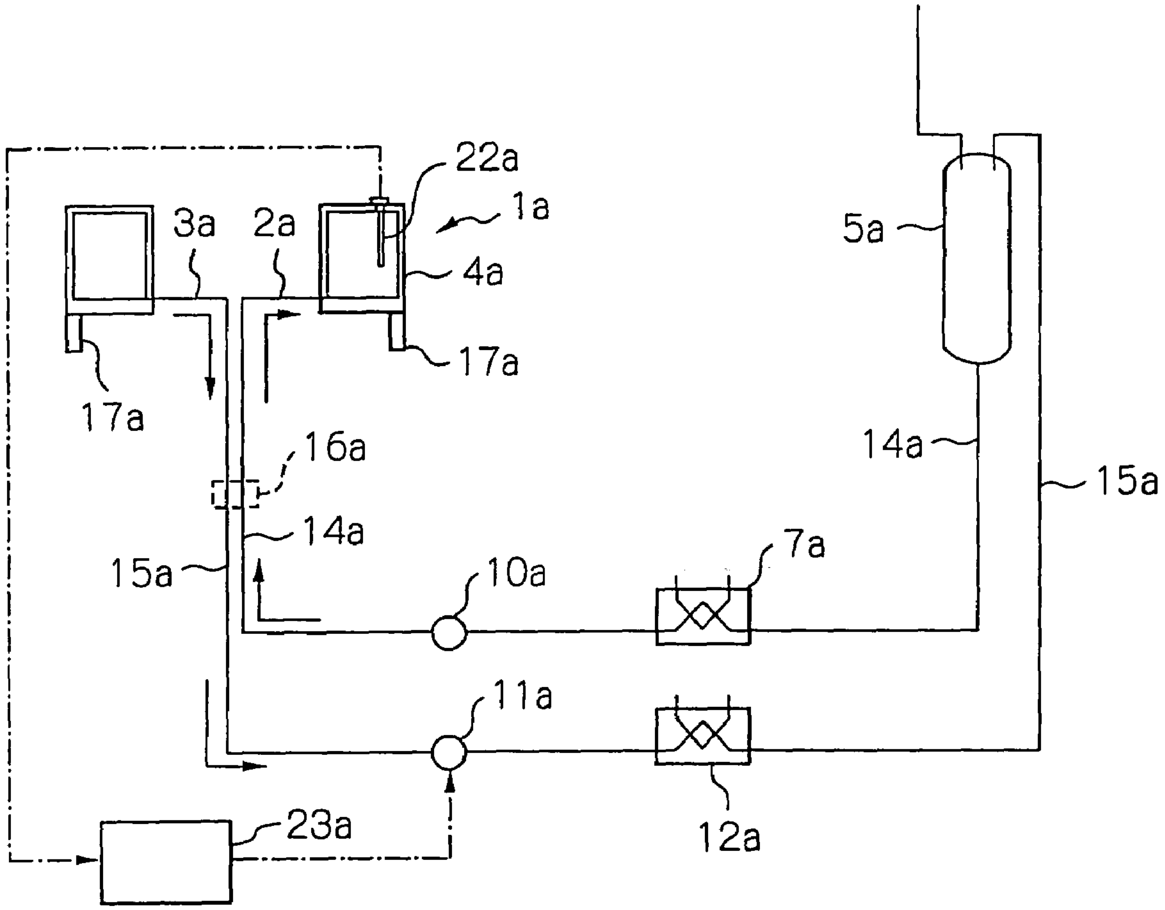
FIG. 5 is a schematic general view showing another embodiment of the liquid filling apparatus according to the invention of this application.

FIG. 5 schematically shows the general arrangement of a liquid filling apparatus having a circulation path according to another embodiment of the present invention. In this embodiment, constituent elements that are substantially the same as those shown in the foregoing embodiment are denoted by the same reference numerals with a suffix “a” added. A liquid filled by this filling apparatus is prepared in a preparation tank (not shown) and delivered to a cushion tank 5*a* where it is stored. It should be noted that in this embodiment a high-temperature liquid is filled, but the liquid as supplied to the cushion tank 5*a* is at normal temperature.

The liquid stored in the cushion tank 5*a* is supplied to a filling liquid tank, i.e. a filler tank 4*a*, of a filler 1*a* through a supply line 14*a* by the operation of a supply pump 10*a* serving as a liquid supply device. The supply line 14*a* is provided with a heater (heat exchanger) 7*a* as a heating device. The liquid from the cushion tank 5*a* is heated to a predetermined temperature for sterilization by the heater 7*a*. After being sterilized in this way, the liquid is delivered to the filler tank 4*a*. It should be noted that in this embodiment the supply pump 10*a* constantly delivers a fixed amount of liquid.

Figure 6:
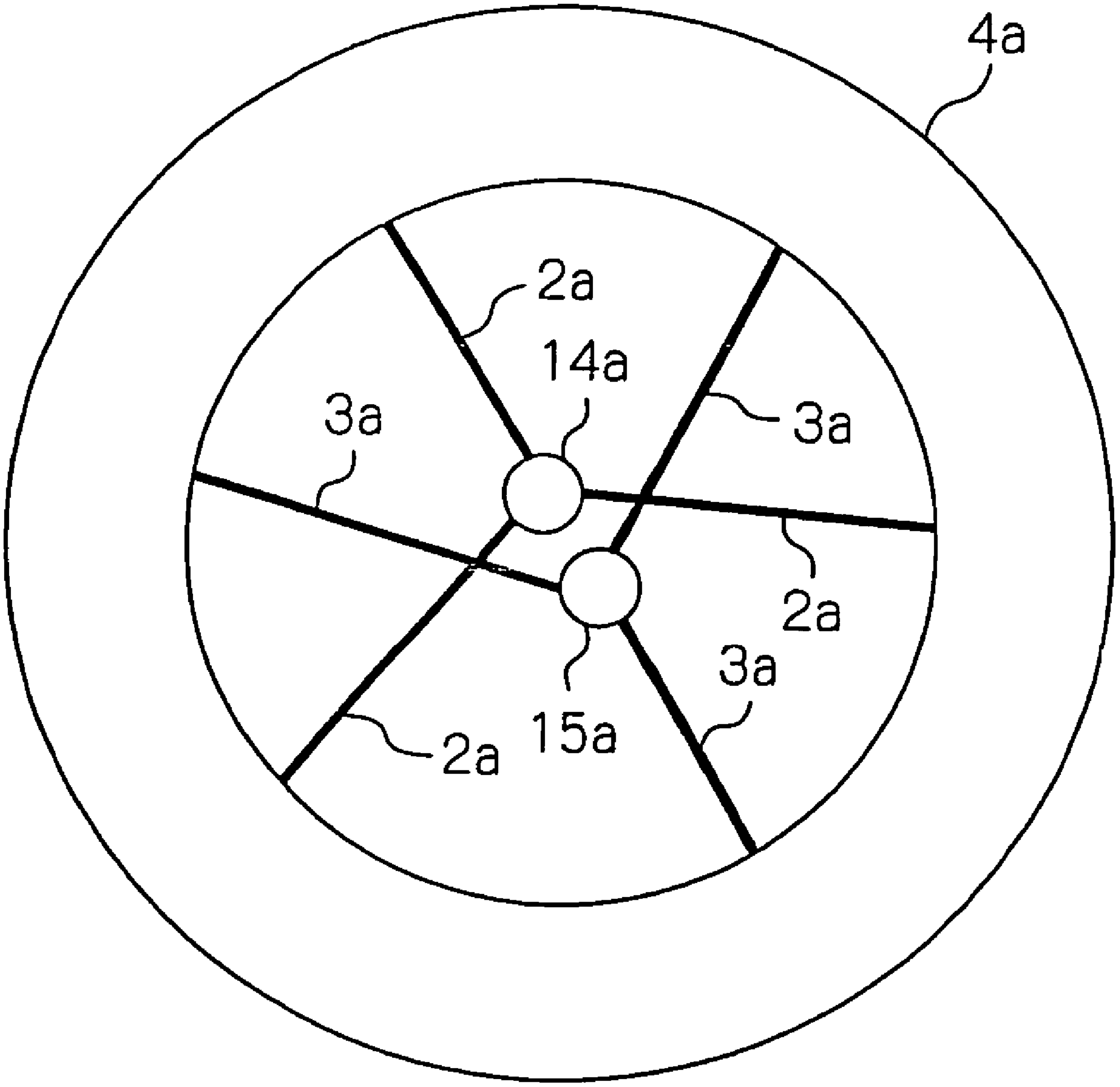
FIG. 6 is a diagram showing supply and return pipes attached to a filler tank of the liquid filling apparatus shown in FIG. 5.

The supply line 14*a* is connected to the filler tank 4*a* of the filler 1*a* through a rotary joint 16*a*. As shown in FIG. 6, the filler tank 4*a* has an annular configuration. The supply line 14*a* is connected to the filler tank 4*a* through a plurality (3 in this embodiment) of circumferentially equally spaced supply pipes 2*a*.

The filler tank 4*a* is further connected with a return line 15*a* through a plurality (3 in this embodiment) of return pipes 3*a* in the same way as the supply line 14*a*. The supply pipes 2*a* of the supply line 14*a* and the return pipes 3*a* of the return line 15*a* are equally spaced. The supply and return pipes 2*a* and 3*a* are arranged alternately in the circumferential direction. The return line 15*a* connects between the filler tank 4*a* of the filler 1*a* and the cushion tank 5*a* through the rotary joint 16*a*. The cushion tank 5*a* , the supply line 14*a*, the filler tank 4*a* and the return line 15*a* form in combination a circulation path. The return line 15*a* is provided with a discharge pump 11*a* serving as a device that returns the liquid from the filler tank 4*a* to the cushion tank 5*a*. The return line 15*a* is further provided with a cooler (heat exchanger) 12*a*. By the operation of the discharge pump 11*a*, the liquid in the filler tank 4*a* is delivered to the cooler 12*a* where it is cooled before being returned to the cushion tank 5*a*. It should be noted that in this embodiment the amount of liquid delivered by the discharge pump 11*a* can be controlled. The amount of liquid delivered is controlled according to a signal from a level sensor 22*a* (described later).

The filler tank 4*a* of the filler 1*a* has a plurality of filling devices (filling valves) 17*a* provided on the outer periphery thereof at equal spacings in the circumferential direction. The filling liquid supplied into the filler tank 4*a* through the supply line 14*a* is filled into containers (not shown) through the filling valves 17*a*.

The filler tank 4*a* is provided with a level sensor 22*a* to detect the amount of liquid in the filler tank 4*a*. A detection signal from the level sensor 22*a* is transmitted to a controller 23*a*. A command from the controller 23*a* controls the amount of liquid delivered by the discharge pump 11*a*.

The operation of the filling system arranged as stated above will be described below. A liquid to be filled into containers is prepared in a preparation tank (not shown) and delivered into the cushion tank 5*a* where it is stored. At this time, the liquid is at normal temperature. The liquid in the cushion tank 5*a* is delivered to the heater 7*a* by the drive of the supply pump 10*a*. After being heated to a predetermined temperature and thus sterilized in the heater 7*a*, the liquid is supplied to the filler tank 4*a* of the filler 1*a*. The level sensor 22*a* provided in the filler tank 4*a* constantly detects the amount of filling liquid in the filler tank 4*a*. The controller 23*a* controls the amount of liquid delivered by the discharge pump 11*a* according to the value of liquid quantity detected by the level sensor 22*a*.

During normal operation, the liquid supplied into the filler tank 4*a* is filled into containers through the filling valves 17*a*, and a larger amount of liquid than is needed for filling is supplied to the filler tank 4*a*. Meanwhile, the filling liquid in the filler tank 4*a* is returned to the cushion tank 5*a* through the cooler 12*a* by the operation of the discharge pump 11*a*. As shown in FIG. 5, the filling liquid from the cushion tank 5*a* constantly circulates through the supply line 14*a*, the heater 7*a*, the supply pump 10*a*, the supply pipes 2*a*, the filler tank 4*a*, the return pipes 3*a*, the discharge pump 11*a*, the cooler 12*a* and the return line 15*a*. In this embodiment, the supply pump 10*a* constantly supplies a fixed amount of liquid to the filler tank 4*a*, whereas the discharge pump 11*a* returns a fixed amount of filling liquid to the cushion tank 5*a* according to the amount of liquid filled from the filling valves 17*a*.

During suspension of the operation of the filler 1*a*, filling from the filling valves 17*a* into containers is not carried out. Therefore, if the same amount of filling liquid as during normal operation is discharged from the filler tank 4*a*, the amount of liquid in the filler tank 4*a* will gradually increase. In this embodiment, however, the amount of liquid discharged from the filler tank 4*a* is increased by controlling the discharge pump 11*a* according to the value of liquid quantity detected by the level sensor 22*a*, thereby adjusting the amount of liquid in the filler tank 4*a*. More specifically, if the detected value from the level sensor 22*a* exceeds a predetermined upper limit, the controller 23*a* judges that the filler 1*a* has stopped operating, and controls the discharge pump 11*a* so that the same amount of filling liquid as supplied from the supply pump 10*a* is returned from the filler tank 4*a*. For example, let us assume that during normal operation, the liquid is supplied from the supply pump 10*a* at a rate of 250 1/m, and the liquid is filled into containers at a rate of 200 1/m, and that the liquid is returned to the cushion tank 5*a* at a rate of 50 1/m by the discharge pump 11*a*. On this assumption, if the filler 1*a* stops operating, no liquid is filled into containers. Therefore, the capacity of the discharge pump 11*a* is increased so that the liquid is returned to the cushion tank 5*a* at a rate of 250 1/m that is the same as the rate (250 1/m) of supply from the supply pump 10*a*. It should be noted that when the filler 1*a* stops operating, the capacity of the supply pump 10*a* may be reduced so that the supply pump 10*a* supplies the liquid at a rate of 50 1/m that is the same as the rate (50 1/m) at which the liquid is returned by the discharge pump 11*a*. The control may be effected such that the capacity of the supply pump 10*a* is reduced to 100 1/m, whereas the capacity of the discharge pump 11*a* is increased to 100 1/m.

The filling liquid refluxed from the filler tank 4*a* is cooled through the cooler 12*a* before being returned to the cushion tank 5*a*. In the case of filling a high-temperature liquid, if the liquid refluxed from the filler tank 4*a* is returned to the cushion tank 5*a* as it is, the temperature in the cushion tank 5*a* rises undesirably. Consequently, when the liquid from the cushion tank 5*a* is thereafter supplied through the heater 7*a*, the liquid temperature undesirably further rises in excess of a set temperature. Therefore, the liquid refluxed from the cushion tank 5*a* is cooled by the cooler 12*a* to a temperature substantially equal to the temperature of the liquid stored in the cushion tank 5*a*.

Accordingly, the amount of liquid that has to be blown when the operation is resumed is extremely small (it is only necessary to blow a very small amount of liquid remaining in the passage extending from the filler tank 4*a* to the filling valves 17*a*). Thus, the loss of filling liquid can be minimized. Although in this embodiment the discharge pump 11*a* is controlled to adjust the amount of liquid returned from the filler tank 4*a*, it should be noted that the adjustment of the amount of liquid returned is not necessarily limited to that effected by controlling the discharge pump 11*a*, but may be made, for example, by using a control valve additionally provided. It is also possible to control the amount of liquid delivered from the supply pump 10*a* on the supply side.

ADVANTAGEOUS EFFECTS OF THE INVENTION

The present invention offers the following advantageous effects.

(a) Even when the filling operation of the filler stops, because the beverage is constantly circulated, the beverage in the filler is stirred. Accordingly, the uniformity of the beverage is maintained throughout the filling line.

(b) A solid component will not settle or surface, and it is possible to keep the solid component content constant when filling a beverage containing a solid component.

(c) Because the liquid is circulated throughout the entire filling line, the temperature of the filler tank and that of the beverage in the filler tank can be prevented from lowering.

(d) The circulation allows the liquid in the filler tank to flow constantly and hence makes it possible to prevent adhesion of the pulp content to the inner surface of the filler tank. Further, because the liquid circulates, it is possible to increase the velocity of washing flow in the filler tank upon completion of the filling operation and hence it is possible to improve the capability to wash away the pulp content.

(e) Because the return liquid is cooled, it is possible to prevent quality degradation that might otherwise occur when the beverage is constantly exposed to high temperature.

(f) When a beverage containing a solid component is filled at high temperature, lowering of the filler temperature can be prevented by circulation of the beverage throughout the entire circulation path extending from the storage tank to the filler. At the same time, stirring induced by the circulation causes mixing of the solid component with the liquid component. Thus, the filling operation can be started rapidly upon resumption of the operation of the filling line.

(g) The circulation eliminates stagnation of a beverage liquid. Consequently, the path from the heater through the filler to a point immediately upstream of the cooler is always kept at high temperature. Thus, it is possible to prevent propagation of microorganisms in this part of the path.

(h) Even in normal or low-temperature filling of a beverage containing a solid component, the solid component and the liquid component are always mixed together by the circulation of the beverage throughout the entire filling line extending from the storage tank to the filler. Therefore, there will occur no separation between the solid component and the liquid components in the filler or the piping. Stirring taking place throughout the path from the storage tank to the filler allows the beverage to be stirred even more uniformly than stirring performed only around the filler as in the conventional technique. Accordingly, the uniformity of products is further improved.

(i) The amount of liquid in the filler tank is detected by means of a detecting device, and at least one of the amount of liquid supplied to the filler tank and the amount of liquid returned from the filler tank is controlled by means of a controller according to a detected value from the detecting device. Accordingly, it is possible to minimize the amount of liquid that has to be blown in the heat-up process when the filling operation is resumed.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A liquid filling method wherein a liquid is delivered from a storage tank into a filler tank of a filler, and said liquid is filled into containers by said filler, said method being characterized in that the liquid in said filler tank is returned through a return piping attached to said filler tank and refluxed to said storage tank through a reflux path so that the liquid circulates throughout the entire filling line extending from said storage tank to said filler constantly during both liquid filling and suspension of liquid filling, wherein an amount of liquid in the filler tank is detected by means of a detecting device, and at least one of an amount of liquid supplied to said filler tank and an amount of liquid returned from said filler tank is controlled according to a detected value from said detecting device, wherein during filling by said filler, the amount of liquid supplied to said filler tank is larger than the amount of liquid returned from said filler tank, and during suspension of filling, the amount of liquid supplied to said filler tank is equal to the amount of liquid returned from said filler tank, and wherein said liquid is a beverage containing a solid component.

2. A liquid filling method wherein a liquid delivered from a storage tank is heat-sterilized before being delivered into a filler tank of a filler, and said liquid is filled into containers by said filler, said method being characterized in that the liquid from said filler tank is constantly flowing and is variably proportioned between returning through a return piping attached to said filler tank and refluxing to said storage tank through a reflux path so that the liquid circulates throughout the entire filling line extending from said storage tank to said filler, wherein the liquid flowing through said reflux path to said storage tank is cooled below a temperature of the liquid in the filler tank wherein an amount of liquid in the filler tank is detected by means of a detecting device, and at least one of an amount of liquid supplied to said filler tank and an amount of liquid returned from said filler tank is controlled according to a detected value from said detecting device, wherein during filling by said filler, the amount of liquid supplied to said filler tank is larger than the amount of liquid returned from said filler tank, and during suspension of filling, the amount of liquid supplied to said filler tank is equal to the amount of liquid returned from said filler tank.

3. A liquid filling method according to claim 2, wherein said liquid is a beverage containing a solid component.

4. A liquid filling method according to claim 2, wherein said refluxing is carried out during both liquid filling and suspension of liquid filling.

5. A liquid filling apparatus that fills a liquid into containers, said apparatus including a liquid filling line having a storage tank that stores the liquid and a filler that fills said liquid into the containers, wherein the liquid in a filler tank is returned through a return piping attached to the filler tank to the entire liquid filling line so that said liquid constantly circulates throughout said liquid filling line, both during liquid filling and suspension of liquid filling, said apparatus further including a detecting device that detects an amount of liquid in said filler tank and a controller that controls at least one of an amount of liquid supplied to said filler tank and an amount of liquid returned from said filler tank according to a detected value from said detecting device, wherein during filling by said filler, the amount of liquid supplied to said filler tank is larger than the amount of liquid returned from said filler tank, and during suspension of filling, the amount of liquid supplied to said filler tank is equal to the amount of liquid returned from said filler tank, wherein said liquid is a beverage containing a solid component.

6. A liquid filling apparatus that fills a liquid into containers, said apparatus including a liquid filling line having a storage tank that stores the liquid, a heat sterilizer that heat-sterilizes said liquid, and a filler that fills said liquid into the containers, wherein at least a portion of the liquid from a filler tank is constantly flowing through return piping attached to said filler tank to the entire liquid filling line so that said liquid circulates throughout the entire liquid filling line, said apparatus further including a cooling device located on said reflux path between the filler tank and the storage tank, wherein the apparatus further including: a detecting device that detects an amount of liquid in said filler tank; and a controller that controls at least one of an amount of liquid supplied to said filler tank and an amount of liquid returned from said filler tank according to a detected value from said detecting device, wherein during filling by said filler, the amount of liquid supplied to said filler tank is larger than the amount of liquid returned from said filler tank, and during suspension of filling, the amount of liquid supplied to said filler tank is equal to the amount of liquid returned from said filler tank.

7. A liquid filling apparatus according to claim 6, wherein said liquid is a beverage containing a solid component.

8. A liquid filling apparatus according to claim 6, wherein said refluxing is carried out during both liquid filling and suspension of liquid filling.

9. A liquid filling method according to claim 1, wherein at least a portion of the liquid in the filler tank is constantly refluxed to the storage tank through the reflux path.

10. A liquid filling method according to claim 2, wherein at least a portion of the liquid in the filler tank is constantly refluxed to the storage tank through the reflux path.

11. A liquid filling apparatus according to claim 5, wherein at least a portion of the liquid in the filler tank is constantly refluxed to the storage tank through the reflux path.

12. A liquid filling apparatus according to claim 6, wherein at least a portion of the liquid in the filler tank is constantly refluxed to the storage tank through the reflux path.

13. A liquid filling method according to claim 1, wherein liquid being refluxed to said storage tank egresses from the filler tank through an opening different from the liquid being filled into containers.

14. A liquid filling method according to claim 2, wherein liquid being refluxed to said storage tank egresses from the filler tank through an opening different from the liquid being filled into containers.

15. A liquid filling apparatus according to claim 5, wherein the filler tank includes at least two different openings such that liquid being refluxed to said storage tank egresses from the filler tank through an opening different from the liquid being filled into containers.

16. A liquid filling apparatus according to claim 6, wherein the filler tank includes at least two different openings such that liquid being refluxed to said storage tank egresses from the filler tank through an opening different from the liquid being filled into containers.

* * * * *